March 17, 1925.　　　　　　　　　　　　　　　　　　　1,530,223
C. H. YOUNG
MOTOR DRIVEN SLED
Filed Oct. 19, 1921　　　4 Sheets-Sheet 1

Inventor
Charles H. Young
By Lancaster and Allwine
Attorneys

March 17, 1925.
C. H. YOUNG
MOTOR DRIVEN SLED
Filed Oct. 19, 1921
1,530,223
4 Sheets-Sheet 2
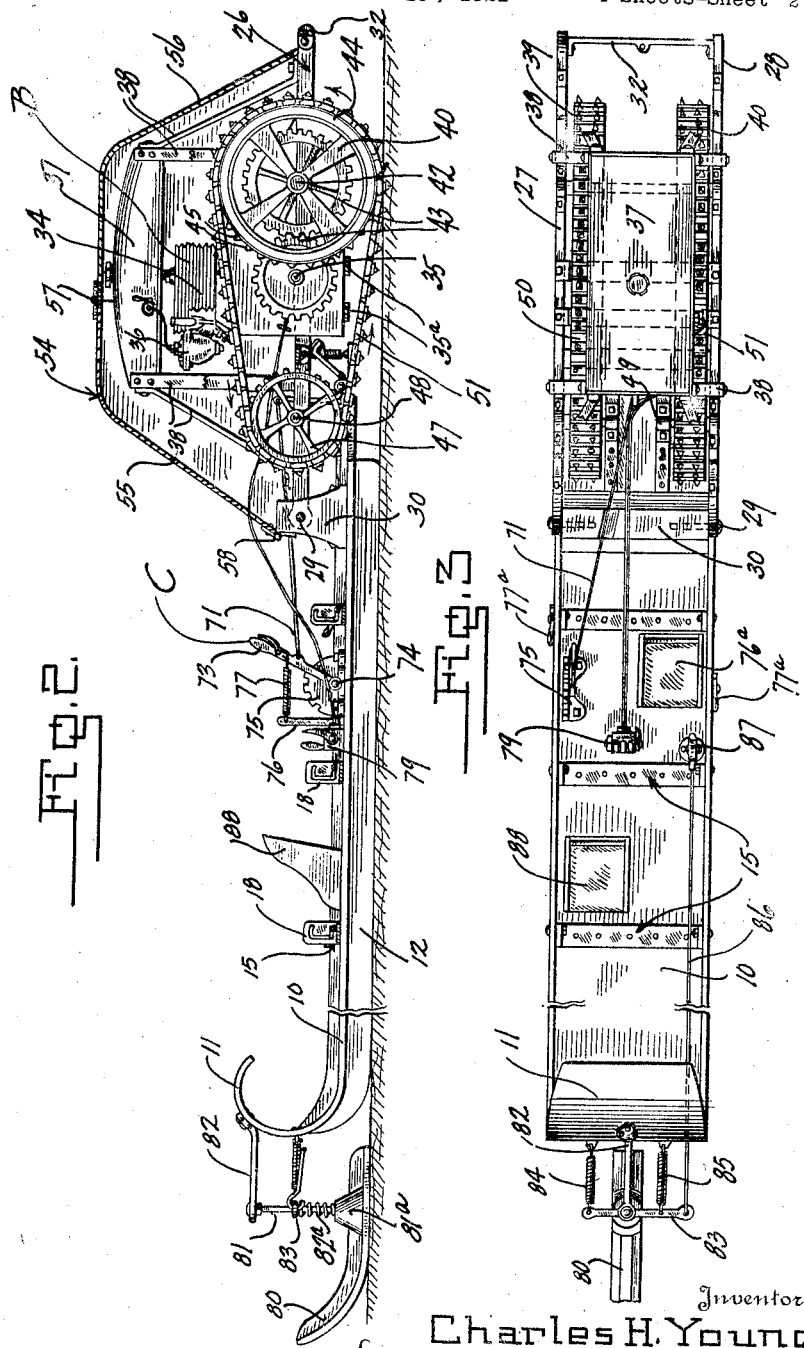
Inventor
Charles H. Young
Attorneys March 17, 1925.  1,530,223
C. H. YOUNG
MOTOR DRIVEN SLED
Filed Oct. 19, 1921    4 Sheets-Sheet 3
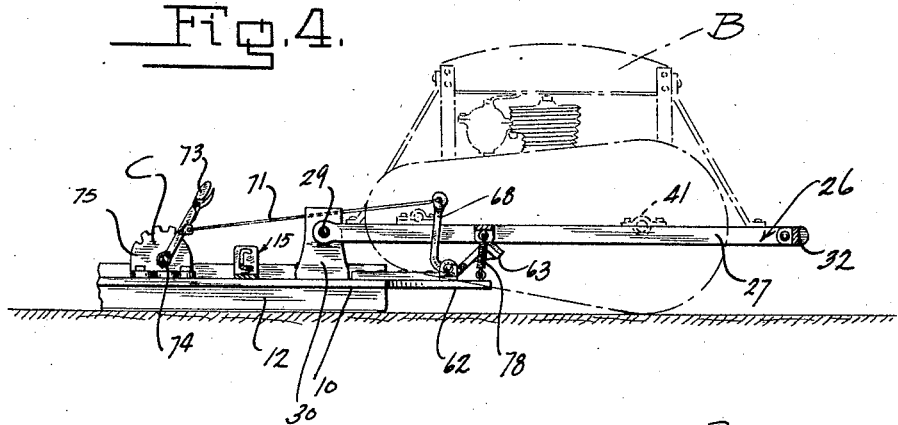
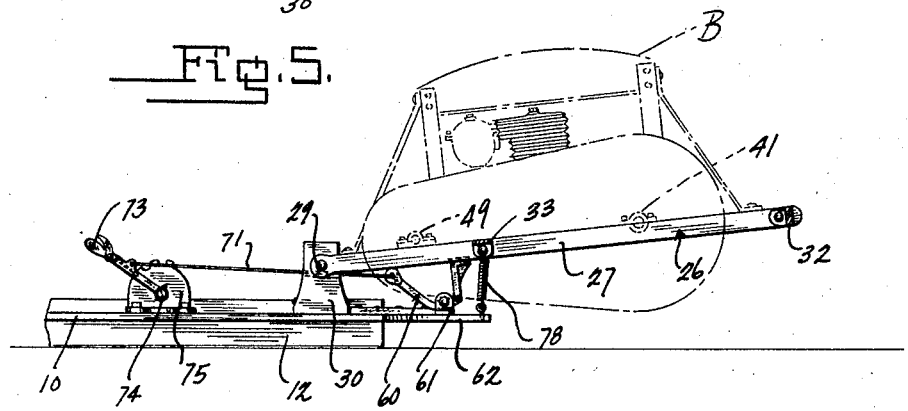
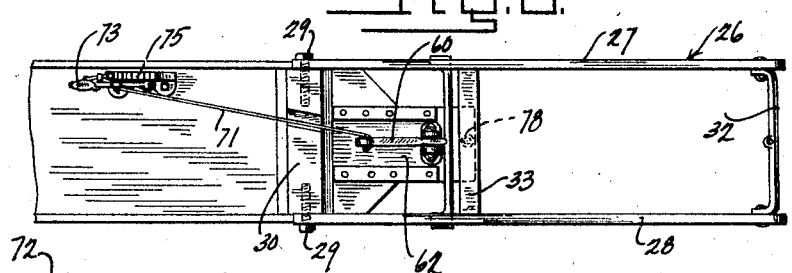
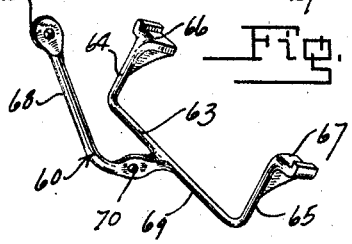
Inventor
Charles H. Young March 17, 1925. 1,530,223
C. H. YOUNG
MOTOR DRIVEN SLED
Filed Oct. 19, 1921   4 Sheets-Sheet 4
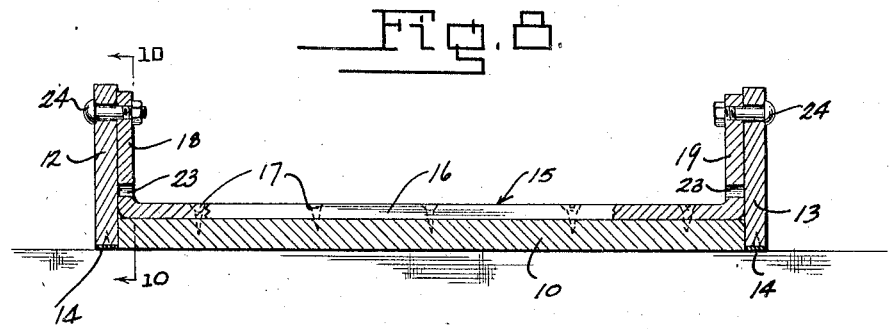
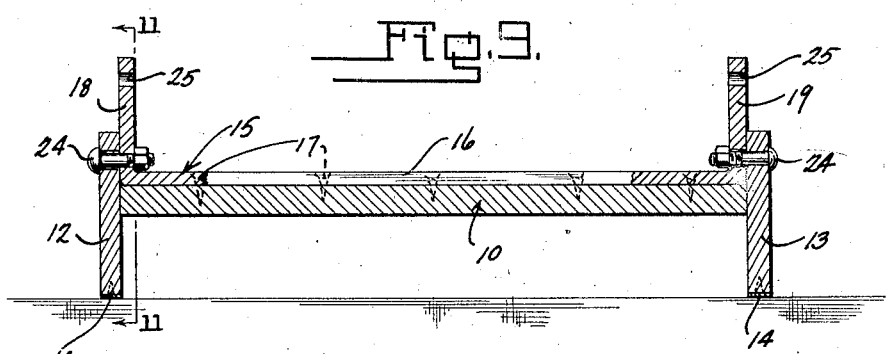
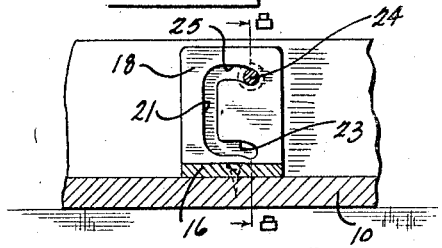
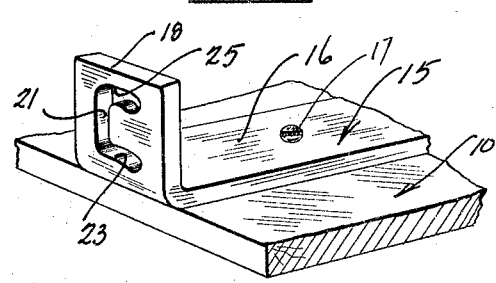
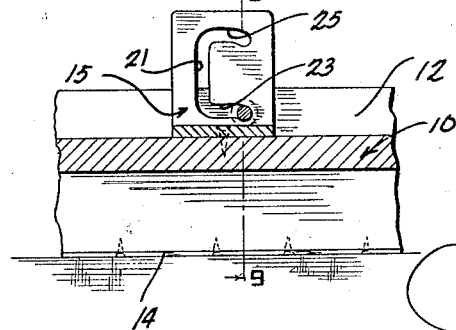
Inventor
Charles H. Young
By Lancaster and Allwine,
Attorneys Patented Mar. 17, 1925.

1,530,223

UNITED STATES PATENT OFFICE.

CHARLES H. YOUNG, OF NORWAY, MAINE.

MOTOR-DRIVEN SLED.

Application filed October 19, 1921. Serial No. 508,845.

*To all whom it may concern:*

Be it known that I, CHARLES H. YOUNG, a citizen of the United States, residing at Norway, in the county of Oxford and State of Maine, have invented certain new and useful Improvements in Motor-Driven Sleds, of which the following is a specification.

This invention relates to improvements in mechanically propelled sleds.

The primary object of the invention is the provision of a sled including a traction power unit of novel formation susceptible of adjustment and alteration to conform the same to the character and consistency of the surface over which the same is travelling.

A further object of the invention is the provision of a sled of the above described character including adjustable runners for converting the same into a flat bottomed toboggan.

A further object of the invention is the provision of a sled including a forward steering rudder, a rear traction power unit, and control means leading to said sled for unitary control of the various mechanisms thereof.

Other objects and advantages will be apparent during the course of the following detailed description.

In the accompanying drawings, forming a part of this specification, and wherein similar reference characters designate corresponding parts throughout the several views.

Figure 2 is a side elevation, partly in cross section showing various operating details of the sled and its power unit.

Figure 3 is a plan view of the improved motor driven sled.

Figure 4 is a fragmentary side elevation of the motor driven sled showing the traction unit thereof as it would appear when driving or propelling the sled.

Figure 5 is a fragmentary side elevation of the rear end of the sled showing an adjusted position of the power unit, whereby the sled may be used independent of the traction unit.

Figure 6 is a fragmentary rear plan of the sled showing the supporting means thereon for receiving the traction unit.

Figure 7 is a perspective view of an element used in connection with the adjusting mechanism of the traction unit.

Figure 8 is a transverse cross sectional view taken on the line 8—8 of Figure 10, showing the manner in which the sled may be adjusted to use the same as a flat bottomed toboggan.

Figure 9 is a transverse cross sectional view through the sled and taken on the line 9—9 of Figure 11, showing the position of the various parts of the sled in order to provide the same with surface engaging runners.

Figure 10 is a fragmentary cross sectional view taken on the line 10—10 of Figure 8.

Figure 11 is a fragmentary cross sectional view taken on the line 11—11 of Figure 9.

Figure 12 is a fragmentary perspective view of certain details of the sled mechanism.

Figure 1:
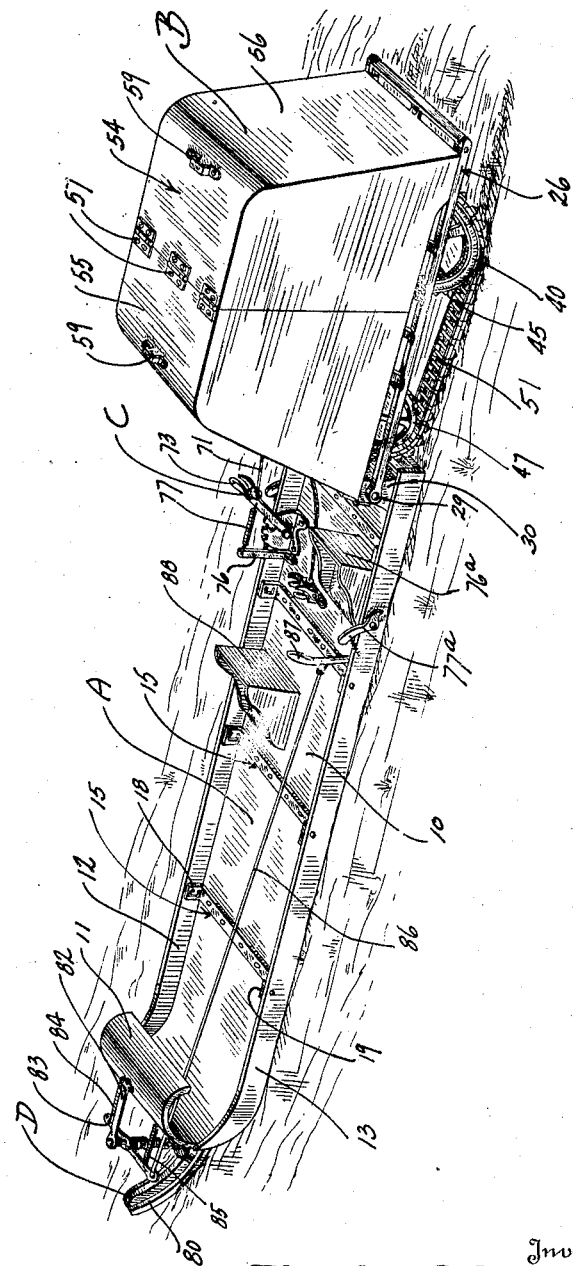
Figure 1 is a perspective view of the improved motor driven sled and showing the various parts thereof in assembled driving position.

In the drawings, wherein for purposes of illustration is shown a preferred embodiment of my invention, the letter A designates a sled body having the traction power unit B adjustably mounted thereon as by the means C. A directional control or steering mechanism D is provided, of novel formation, for guiding the sled in a preferred direction.

The sled A is of special formation, the same being of rectangular elongated shape. A bottom 10 is provided, of any approved material, extending longitudinally of the sled A and having the forward end 11 curled upwardly and over in appropriate conventional manner to provide a dash. It is preferred that the said body A be so formed as to be capable of conversion to the flat bottom toboggan sled type, or a sled with relatively deep runners. To this end, detachable sides 12 and 13 have been provided for positioning adjacent the longitudinal edges of the bottom 10, each of said sides 12 and 13 having steel runners or wear strips 14 upon the bottoms thereof. In order to adjustably mount the sides 12 and 13, a plurality of substantially U-shaped attaching members or brackets 15 are provided transversely of the bottom member 10; the bight portion 16 of said members 15 being detachably connected, as by screw elements 17 upon the top surface of said bottom 10, in order to provide the legs 18 and 19 thereof upstanding adjacent the side edges of said bottom 10. Each leg 18 and 19 is provided with a double bayonet slot therein comprising a vertical slot 21 having the horizontal and downwardly curved offsets 23 and 25 communicating at the lower and upper ends respectively of said vertical slot portion 21. Detachable bolt members 24 are provided for extending transversely through the sides 12 and 13 and adjacent the upper edges thereof as is clearly illustrated in Figures 8 and 9. A bolt 24 is provided for cooperation with each leg 18 and 19 of the attaching member 15 and adapted for engagement within the double bayonet slot of said legs. It is preferred that the outer surface of each of the legs 18 and 19 lie flush with the outer edges of the bottom 10, in order that the sides 12 and 13 may abut in intimate contact with the edges of said bottom 10, as well as with the side surfaces of said legs 18 and 19. When the sides 12 and 13 are assembled, as above described, with their bolt members 24 engaging in the legs 18 and 19 of the members 15, said bolts 24 may be positioned in either of the offsets 23 and 25. When the bolt members 24 engage in the lower offsets 23 of the legs 18 and 19, the sides 12 and 13 will depend below the bottom 10, for a considerable distance and providing sled runners for the body A. When in this position, the bolts 24 will be securely mounted in the remote ends of the slots 23 and consequently prevented from accidental detachment from the legs 18 and 19. As can be readily understood by one skilled in the art to which this invention pertains, the sides 12 and 13 will be utilized as runners as illustrated in Figure 9, over roads or country upon which the snow is thickly packed, or upon ice surfaces. However, when the sled is to be propelled over snow, which is loosely packed, as is sometimes the case, and especially during a snow storm, it will be desirable to use the sled A in the flat bottom toboggan type. This can readily be accomplished by forward sliding of the sides 12 and 13, whereby the bolts 24 will be slid upwardly in the vertical slots 21 until the same are positioned in the remote ends of the upper horizontal slots 25. When in this position, the sides 12 and 13 will be drawn upwardly from the bottom surface of the bottom member 10, until the wear runners 14 thereof lie substantially flush with the bottom surface of the bottom member 10, as clearly illustrated in Figure 8. In this position, it can readily be understood that the sled body A is adaptable for use as a flat bottom toboggan type.

The traction power unit B is preferably of the internal combustion engine type, including a supporting frame 26 formed of a pair of longitudinal side rails 27 and 28 each pivotally connected at one end 29 to a standard 30, mounted in any approved manner upon the rear end of the sled A. The frame 26 projects rearwardly from the sled body A and includes a rear connecting cross piece 32 for joining the most rearwardly extending ends of the side members 27 and 28. An intermediate member 33 may be provided for joining the side members 27 and 28, and in addition to serving as a brace this member 33 serves a function to be subsequently set forth. The unit B may be mounted as at 35ª to the frame 26 in order to position the crank shaft 35 transversely of the frame 26. The carburetor 36 is provided for use with cylinders 34 and the mechanism therein, said carburetor being fed from a fuel supply tank 37, which is mounted upwardly of the traction unit B, as by the supporting bars or standards 38 connected to the frame 26 in any approved manner.

A pair of traction wheels 39 and 40 are mounted as by bearings 41 to the side members 27 and 28, and include an axle 42 to which they are keyed. It is preferred that the traction wheels 39 and 40 be of relatively large diameter and rearwardly mounted with respect to the cylinders 34. Suitable sprocket wheels or gear changing mechanism 43 may be provided, to operably connect the crank shaft 35 on the power unit B with the axle 42 to which the wheels 39 and 40 are keyed. The traction wheels 39 and 40 preferably include an outer tire 44 of rubber or the like, and appropriately studded with steel calks 45 or the like.

When driving over relatively hard packed snow or ice surfaces, the calked wheels 39 and 40 will be sufficient to propel the sled body A. However, it will be desirable to secure a better traction and anti-skid arrangement when travelling over relatively soft packed snow surfaces. To this end, a pair of wheels 47 of smaller diameter than the traction wheels 39 and 40 have been mounted upon the axle 48, and in bearings 49, upon the side members 27 and 28 and forwardly of the cylinders 34. The wheels 47 are studded and adapted for receiving the right and left endless belt traction members 50 and 51. The endless belt traction members 50 and 51 are each adapted for engaging a forward wheel 47, and for respectively engaging the rear traction wheels 39 and 40, to provide for the mounting of said endless belt traction members. The calk members 45 upon the wheels 39 and 40 are of such formation as to readily adapt themselves to the belts 50 and 51 in the well known manner. The belts 50 and 51 are, of course, detachable and may be used as above described or dispensed with for using the traction wheels 39 and 40 by themselves. When the cylinders of the internal combustion engine are properly functioning to rotate the crank shaft 35, the traction wheels 39 and 40 or the belts 50 and 51 are of course, propelled in such manner that the same engage a snow or ice surface for properly propelling the sled body A forwardly. Through the pivotal mounting 29 of the frame 26, the traction power unit B readily conforms to the topography of the country over which the same is travelling. The snow or ice will, of course, be kicked up, so to speak, toward the sled A. To prevent discomfort to a person riding in the sled body A, a hood structure 54 has been provided, including a forward section 55 and a rear section 56 hingedly connected upon top as by the hinges 57. The forward section 55 is hinged as at 58 to the standard 30, and whereby both sections of the hood 54 may be swung to clear the power unit B. Suitable handles 59 are provided upon the sections 55 and 56 to conveniently lift the same.

The means C for adjustably positioning the traction unit B includes a crank arm 60, simulating somewhat the bell crank type, and pivotally mounted upon a standard 61 positioned upon a rear extension 62 of the sled body A. The crank 60 preferably includes the rear U-shaped portion 63 adapted for transverse mounting on the frame 26; the free ends of the outwardly extending stems 64 and 65 being provided with L-shaped shelves 66 and 67 respectively, and for respective engagement beneath the side members 27 and 28 of the power unit supporting frame 26. The arm 68 of the bell crank 60 is connected centrally of the bight portion 69 of the rear arm 63, and provided with an aperture 70 adjacent the point of connection of the arms 63 and 68 for receiving an element to pivotally connect the same, as above mentioned, to the standard or bearing 61. The unit B when propelling the sled body A functions independently of the adjusting mechanism C. However, at times, it will be desirable to utilize the sled body A independent of the propelling unit B, as when coasting down a hill, manually propelling the sled body A, or the like. In such case, it will, of course, be necessary to entirely support the power unit B upon the sled body A and free of the ground surface over which the improved sled is travelling. A rod 71 is pivotally connected to the apertured end 72 of the forward arm 68 upon the bell crank 60 and extend forwardly to be pivotally connected to a pawl arm 73; said pawl arm 73 being pivotally mounted as at 74 to a segmental rack 75 conveniently located at some point upon the bottom member 10 of the sled body A and adjacent the operator's seat 76ª. By pivotal forward movement of the pawl arm 73, it can be seen that the bell crank 60 will be rocked, whereby the shelf portions 66 and 67 thereof may be brought into engagement with the under surface of the side members 27 and 28, and upon further forward movement of the arm 73, the entire frame 26 will be rocked upon its pivots 29, whereby the entire traction unit B will be swung clear of the ground, substantially as illustrated in Figure 5. The pawl arm 73, of course, has suitable mechanism for engagement with teeth upon the segmental rack 75, whereby the unit B may be held suspended free of the snow or ice surface over which the sled is travelling. A portion of the segmental rack 75 is, of course, free of teeth, and when the traction unit B is in position to propel the sled body A, the bell crank 60 is out of supporting engagement with the frame 26. In order to insure against the lever 73 and the crank 60 falling too far to the rear, a support 76 has been provided upon the sled A conveniently located with respect to the lever 73, whereby a spring 77 may engage the stationary support 76 and lever 73 to normally pull the pawl arm 73 sufficiently forwardly to insure against dropping of said arm and the crank 60.

As a further aid in insuring a good gripping engagement with a snow or ice surface, a relatively strong tension spring 78 is provided for engagement upon the extreme end of the sled rear extension 62, and for engagement beneath the cross member 33 of the frame 26, whereby said frame 26 is normally pulled downwardly for securely forcing the traction members and devices of the power unit B into firm engagement with the snow or ice surface. A suitable motor device 79 may be mounted adjacent the driver's seat 76ª and for operation of the various parts of the power unit B, such as the change speed mechanism, and the like. Brakes 77ª may be provided pivoted to the sled A, as a speed checking means.

The steering mechanism D preferably includes a rudder 80 having a vertical shaft 81, pivotally supported in a horizontal bracket structure 82 carried by the dash 11 of the sled body A. It is preferred that the rudder 80 be mounted forwardly of the sled body A, and a horizontal steering arm 83 is provided rigid with the shaft 81; the springs 84 and 85 being positioned upon the right and left respectively of the vertical shaft 81 and engaging adjacent the ends of the steering arms 83 and mounted to the dash 11 for normally maintaining the steering rudder 80 in alignment with the sled body A. To compensate for rise and fall of the bottom 10 during use or disuse of the sides 12 and 13, the shaft 81 is slidable in a box 81ª, the rudder 80 being normally forced into ground engagement and a spring 82ª, under compression between the arm 83 and box 81ª. In order to control the rudder 80 from a point adjacent the driver's seat 76ª, a steering rod 86 is provided, in engagement with the extreme left end of the steering arm 83 and leading through the dash 11 to a control lever 87 pivotally mounted upon the sled bottom 10.

From the foregoing, it can be seen that a motor driven sled has been provided, for universal use upon the various types of snow and ice surfaces ordinarily encountered. An important feature is the fact that when using the sled body A in its flat bottom toboggan manner, the snow or sliding surface of the ground will be packed down suitable for firm engagement of the traction elements of power unit B therewith, whereby the maximum driving power of the unit B may be effected to speed the sled body A forwardly. Although, the power unit B may be entirely swung upwardly, as above described upon the sled body A, the same does not interfere with the equilibrium of the sled A, since sufficient ballast may be positioned forwardly in the sled A to counter-act the weight of the unit B when in such position. Any number of seats 88 may be provided upon the bottom of the sled A, consistent with the use to which the motor sled A is to be put.

Various changes in the shape, size and arrangement of parts, may be made to the form of the invention herein shown and described without departing from the spirit of the invention or the scope of the claims.

I claim:

1. A device of the class described comprising a sled body, a frame pivotally connected rearwardly of said sled body, a power unit on said frame, endless belt treads for operation by said power unit and normally resting upon a surface for propelling said sled forwardly, a bell crank lever on said sled, means for operating said bell crank lever to raise or lower the power unit whereby said power unit treads are engaged or disengaged with a ground surface, and a hood for entirely covering said treads.

2. A sled, comprising a toboggan bottom, runners, and means adjustably connecting said runners to said bottom to serve as upstanding sides of said toboggan bottom or as depending runners for said bottom.

3. A device of the class described comprising a bottom, side runners, U-shaped brackets having bayonet slots in the legs thereof, and pins in said runners for engaging in the bayonet slots for adjustment of said side runners, whereby the sled may be adjusted to serve as a flat bottom toboggan, or said sides positioned to serve as sled runners.

4. A device of the class described comprising a sled having a flat bottom, runners at opposite sides of the bottom and vertically adjustable whereby said bottom may be selectively supported above a snow surface by the runners or the runners positioned to extend above the bottom and the bottom permitted of engagement with the snow surface to provide a snow packed track, and traction propelling means connected to said sled and following in the wake thereof to engage in the snow packed track of said sled.

5. A device of the class described, comprising a sled, means for converting said sled into the runner type or to function as a flat bottom toboggan, a traction unit, and means pivotally mounting said traction unit to the rear of said sled for propelling the same forwardly in either of its converted positions.

6. A motor driven sled comprising a sled body, side arms pivotally connected at the extreme end of said sled to extend rearwardly thereof, a cross arm connecting the extreme ends of said side arms, a traction unit carried by said side arms, a crank member pivotally carried by said sled body having a transverse bar adapted to engage said side arms intermediate their ends for supporting said traction unit in an elevated non-ground engaging position, means for maintaining said crank in position for elevated support of said traction unit, and a spring member connecting said sled body and side bars and tending to draw said traction unit into ground engaging position.

7. A sled comprising a flat bottom, substantially U-shaped brackets transversely carried at spaced intervals by said bottom and providing upstanding side portions at the side edges of said bottom, said upstanding portions each having substantially U-shaped slots therein, detachable sled runners, and pins connecting said sled runners in the U-shaped slots of the upstanding portions of the U-shaped brackets whereby the runners may be adjusted to depend from the bottom to support said sled or may be elevated above the lower surface of said bottom to provide sides for said bottom as a toboggan.

CHARLES H. YOUNG.